(12) United States Patent
Kang

(10) Patent No.: US 7,786,847 B2
(45) Date of Patent: Aug. 31, 2010

(54) RADIO FREQUENCY IDENTIFICATION DEVICE

(75) Inventor: Hee Bok Kang, Cheongju-si (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 503 days.

(21) Appl. No.: 11/812,832

(22) Filed: Jun. 22, 2007

(65) Prior Publication Data

US 2008/0018483 A1 Jan. 24, 2008

(30) Foreign Application Priority Data

Jul. 18, 2006 (KR) .................... 10-2006-0066951

(51) Int. Cl.
*H03K 17/62* (2006.01)

(52) U.S. Cl. .................... 340/14.61; 340/10.1

(58) Field of Classification Search .......... 340/442, 340/443, 444, 445, 446, 447, 448, 449, 589, 340/10.1, 10.2, 10.3, 10.31, 10.4, 10.41, 340/10.5, 14.61

See application file for complete search history.

(56) References Cited

U.S. PATENT DOCUMENTS

| | | | | |
|---|---|---|---|---|
| 5,164,728 A | * | 11/1992 | Matsuzawa et al. | 341/159 |
| 5,923,258 A | * | 7/1999 | Tseng | 340/584 |
| 6,369,712 B2 | * | 4/2002 | Letkomiller et al. | 340/572.1 |
| 6,515,917 B2 | * | 2/2003 | Lamb et al. | 365/189.09 |
| 6,617,963 B1 | * | 9/2003 | Watters et al. | 340/10.41 |
| 6,957,158 B1 | * | 10/2005 | Hancock et al. | 702/61 |
| 7,311,076 B2 | * | 12/2007 | Wineland | 123/198 D |
| 7,432,825 B2 | * | 10/2008 | Chan et al. | 340/870.17 |
| 2005/0146964 A1 | * | 7/2005 | Sako | 365/211 |
| 2006/0214775 A1 | * | 9/2006 | Watanabe et al. | 340/10.41 |
| 2007/0096880 A1 | * | 5/2007 | Nagai | 340/10.41 |
| 2007/0171693 A1 | * | 7/2007 | Koyama | 365/145 |

* cited by examiner

*Primary Examiner*—Daniel Wu
*Assistant Examiner*—Rufus Point
(74) *Attorney, Agent, or Firm*—IP & T Law Firm PLC

(57) ABSTRACT

An RFID device includes an analog block configured to receive a radio frequency signal so as to output an operation command signal, a digital block configured to output an address, a temperature address, an operation control signal, and a temperature sensor activation signal in response to the operation command signal received from the analog block and to provide a corresponding response signal into the analog block. The device further includes a memory block configured to receive the address, the temperature address, and the operation control signal so as to generate an internal control signal for controlling the internal operation, and to read/write data in a cell array including a non-volatile ferroelectric capacitor in response to the internal control signal, and a temperature sensor processing unit configured to detect a temperature change state of an RFID tag in response to the temperature sensor activation signal.

18 Claims, 6 Drawing Sheets

RADIO FREQUENCY IDENTIFICATION DEVICE

CROSS-REFERENCES TO RELATED APPLICATIONS

The present application claims the benefit of priority to Korean patent application number 10-2006-0066951, filed on Jul. 18, 2006, the entire contents of which are incorporated by reference.

BACKGROUND

The present invention relates generally to a radio frequency identification (RFID) Device, and more specifically, to an RFID device including a temperature sensor in an RFID tag chip.

Recently, a ferroelectric random access memory (FeRAM) has attracted considerable attention as next generation memory device, because it has a data processing speed as fast as a dynamic random access memory (DRAM) and preserves data even after the power is turned off.

The FeRAM, which may have structures similar to the DRAM, may include capacitors made of a ferroelectric substance. The FeRAM may utilize the high residual polarization characteristics of the ferroelectric substance, which may preserve data even after an electric field is eliminated.

A conventional RFID device comprises a plurality of chip blocks, such as an analog block, a digital block, and a memory block. The RFID device may be operated with a power source transmitted into an antenna of the RFID device. However, the power source may become weaker when the chip blocks are located far away from the power source. As a result, each chip block may only receive a minimal electric power.

For an RFID tag, when materials sensitive to temperature are treated, the temperature of each check point is recorded during a material moving process. As a result, it is necessary to track the temperature change. However, the conventional RFID tag requires an additional temperature sensor, because the conventional RFID tag may not detect temperature by itself.

SUMMARY

Various embodiments consistent with the present invention are directed to providing an RFID device configured to detect a temperature directly in a RFID tag chip, so as to output a voltage, convert the voltage into a digital signal, and output the signal into a data bus without any additional temperature sensor, thereby reducing the layout area of the RFID device.

Various embodiments consistent with the present invention are directed to providing an RFID device configured to store temperature data of an RFID tag chip in a temperature memory allotted in a specific area of a cell region, thereby facilitating usage of the measured temperature information.

In one embodiment, an RFID device includes: an analog block configured to receive a radio frequency signal so as to output an operation command signal; a digital block configured to output an address, a temperature address, an operation control signal, and a temperature sensor activation signal in response to the operation command signal received from the analog block, and to provide a corresponding response signal into the analog block; a memory block configured to receive the address, the temperature address, and the operation control signal so as to generate an internal control signal for controlling the internal operation, and to read/write data in a cell array including a non-volatile ferroelectric capacitor in response to the internal control signal; and a temperature sensor processing unit configured to detect a temperature change state of an RFID tag in response to the temperature sensor activation signal.

DETAILED DESCRIPTION

The present invention will be described in detail with reference to the accompanying drawings.

Figure 1:
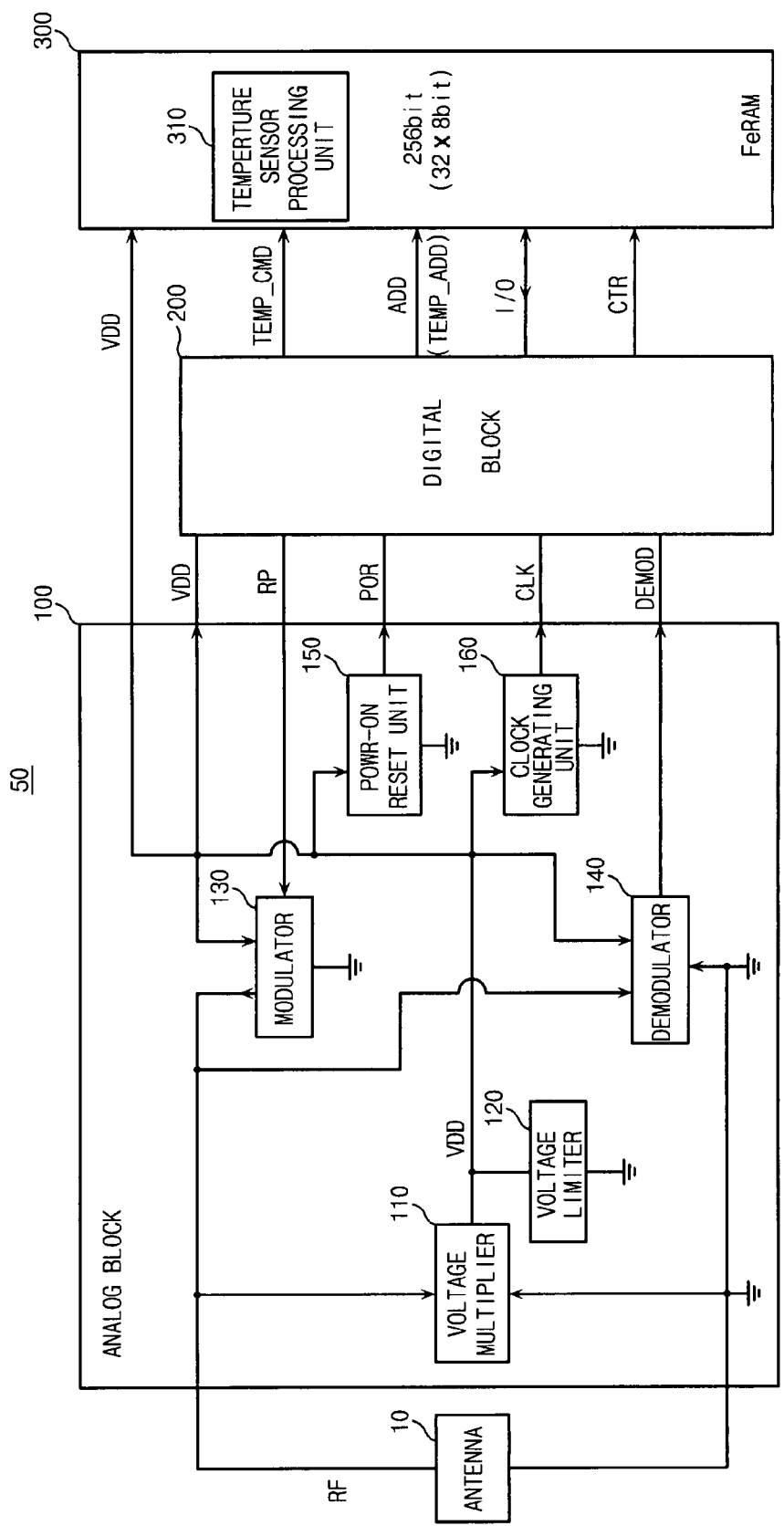
FIG. 1 is a diagram illustrating an RFID device according to an embodiment consistent with the present invention.

FIG. 1 is a diagram illustrating an RFID device 50 according to an embodiment consistent with the present invention. RFID device 50 may include an analog block 100, a digital block 200, and a non-volatile ferroelectric random access memory (FeRAM) 300.

Analog block 100 may include a voltage multiplier 110, a voltage limiter 120, a modulator 130, a demodulator 140, a power-on reset unit 150, and a clock generating unit 160.

An antenna 10 of analog block 100 may be configured to transmit and receive a radio frequency signal RF between an external reader or writer and RFID device 50. Voltage multiplier 110 may generate a power voltage VDD, which is a driving voltage of RFID device 50, by a radio frequency signal RF received by antenna 10. Voltage limiter 120 may restrict a transmission voltage of radio frequency signal RF received by antenna 10 to output the voltage into demodulator 140 and clock generating unit 160.

Modulator 130 may modulate a response signal RP transmitted from digital block 200, and transmits response signal RP into antenna 10. Demodulator 140 may detect an operation command signal from radio frequency signal RF received by antenna 10 depending on output voltages of voltage multiplier 110 and voltage limiter 120, and output a command signal DEMOD into digital block 200.

Power-on reset unit 150 may sense an output voltage VDD of voltage multiplier 110 to output a power-on reset signal POR for controlling a reset operation into digital block 200. Clock generating unit 160 may supply a clock signal CLK for controlling the operation of digital block 200 into digital block 200 depending on output voltage VDD of voltage multiplier 110.

Digital block 200 may receive power voltage VDD, power-on reset signal POR, clock signal CLK, and command signal DEMOD from analog block 100, analyze command signal DEMOD, and generate a control signal and processing signals to output response signal RP into analog block 100. Digital block 200 may output an address ADD, an input/output data I/O, a control signal CTR, and a temperature sensor activation signal TEMP_CMD for driving a temperature sensor into FeRAM 300.

FeRAM 300 may be a memory block for reading and writing data with a non-volatile ferroelectric capacitor. FeRAM 300 may include a temperature sensor processing unit 310 that detects a temperature change in a RFID tag chip in response to temperature sensor activation signal TEMP_CMD received from digital block 200.

Figure 2:
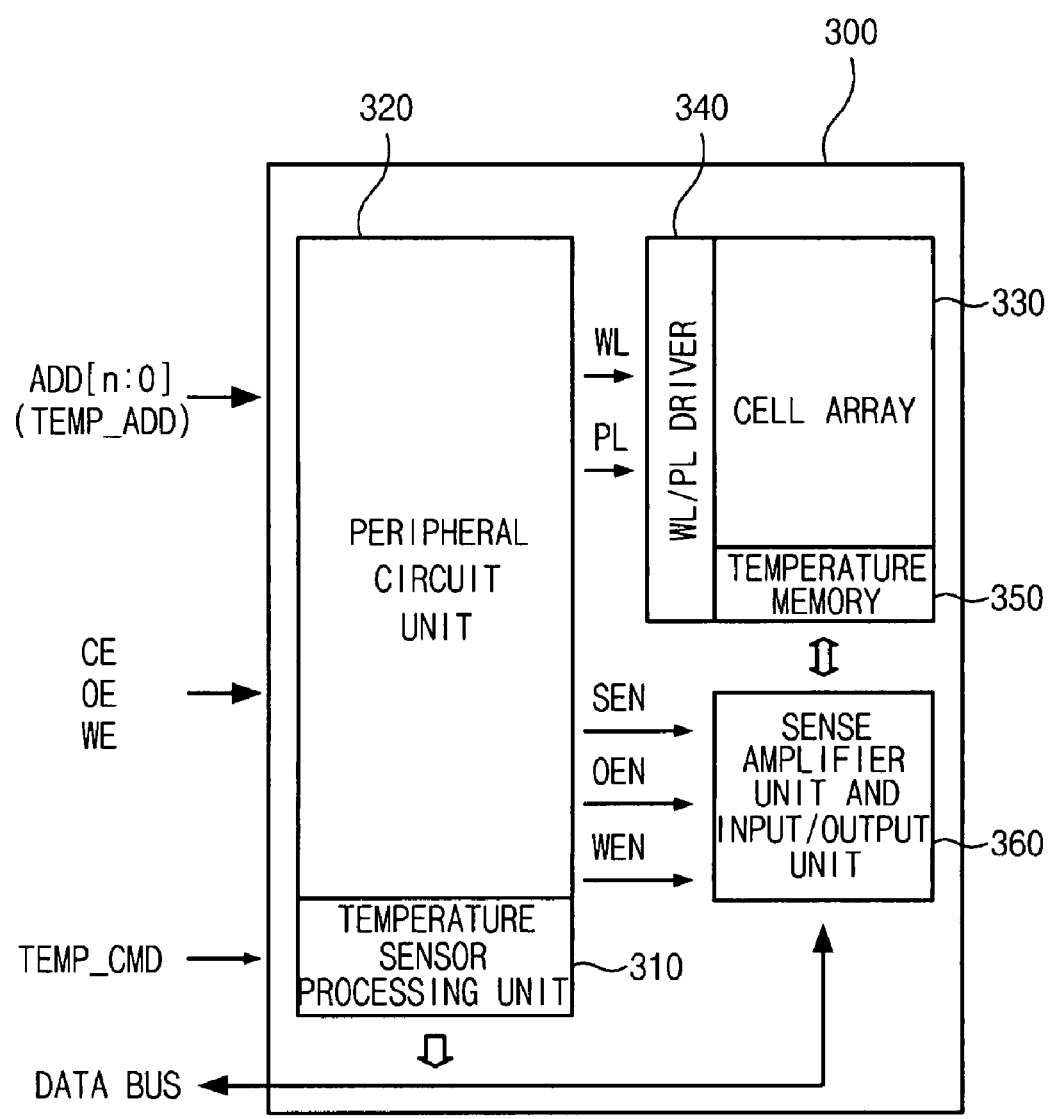
FIG. 2 is a diagram illustrating the memory block of FIG. 1.

FIG. 2 is a diagram illustrating the memory block 300 of FIG. 1.

Memory block 300 may include a temperature sensor processing unit 310, a peripheral circuit unit 320, a cell array 330, a word line/plate line driver 340, a temperature memory 350, a sense amplifier unit, and an input/output unit 360.

Temperature sensor processing unit 310 may detect a temperature change of the RFID tag chip in response to temperature sensor activation signal TEMP_CMD received from digital block 200, and convert the detected temperature change into a digital output signal, thereby outputting the digital output signal into a data bus.

Peripheral circuit unit 320 may control a word line WL and a plate line PL for driving cell array 330 in response to an address ADD[n:0], a temperature address TEMP_ADD, a chip enable signal CE, an output enable signal OE, and a wire enable signal WE received from the digital block 200. Peripheral circuit unit 320 may also control temperature sensor processing unit 310.

Peripheral circuit unit 320 may output a sense amplifier signal SEN for regulating activation of sense amplifiers, an output enable signal OEN for outputting data sense in the sense amplifier into the data bus, and a write enable signal WEN for writing data received from the data bus into cell array 330.

Cell array 330, which may include a plurality of unit cells each including a non-volatile ferroelectric capacitor and a switching element, stores data in the non-volatile ferroelectric capacitor to read the stored data. Word line/plate line driver 340 drives word line WL and plate line PL.

Temperature memory 350 may receive data corresponding to the temperature detected by temperature sensor processing unit 310 through the data bus, and store the data. Temperature memory 350 may be a memory cell array region allotted by a plurality of temperature addresses TEMP_ADD.

Sense amplifier unit and input/output unit 360 may control the operation in response to sense amplifier enable signal SEN, output enable signal OEN, and write enable signal WEN, which are received from peripheral circuit unit 320. Sense amplifier unit and input/output unit 360 may sense and amplify data received from cell array 330 to output the data into the data bus, and transmit the data received from the data bus into cell array 330.

Figure 3:
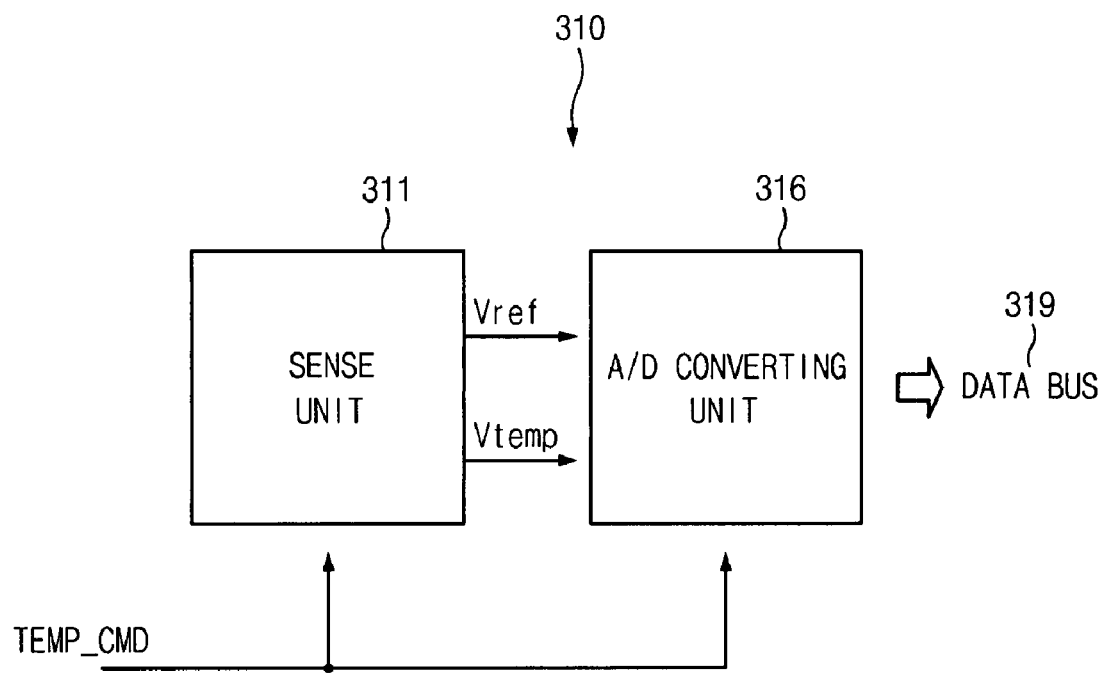
FIG. 3 is a circuit diagram illustrating the temperature sensor processing unit of FIG. 2.

FIG. 3 is a circuit diagram illustrating temperature sensor processing unit 310 of FIG. 2.

Temperature sensor processing unit 310 may include a sense unit 311 and an A/D converting unit 316.

Sense unit 311 may sense a temperature of the RFID tag chip in response to temperature sensor activation signal TEMP_CMD received from digital block 200 to output a reference voltage Vref and a temperature detecting voltage Vtemp. A/D converting unit 316 may generate a thermometer code in response to reference voltage Vref and temperature detecting voltage Vtemp, and output a digital output signal corresponding to the thermometer code into a data bus 319 in response to temperature sensor activation signal TEMP_CMD.

Figure 4:
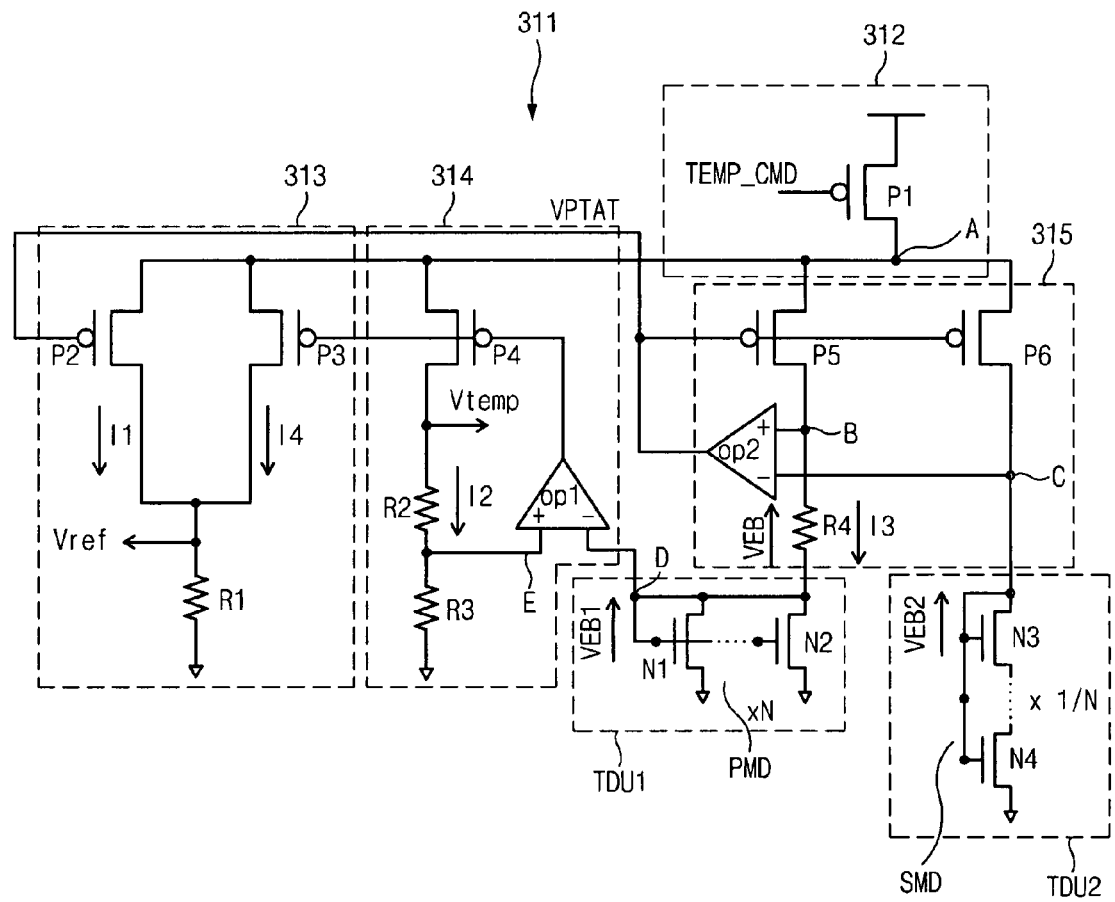
FIG. 4 is a circuit diagram illustrating the sense unit of FIG. 3.

FIG. 4 is a circuit diagram illustrating sense unit 311 of FIG. 3.

Sense unit 311 may include a pull-up unit 312, a reference voltage generating unit 313, a first temperature detecting unit TDU1, a second temperature detecting unit TDU2, a first amplifying unit 314, and a second amplifying unit 315.

Reference voltage generating unit 313 may include PMOS transistors P2 and P3, and a resistor R1. First temperature detecting unit PMD may include a parallel MOS diode unit PMD. Second temperature detecting unit TDU2 may include a serial MOS diode unit SMD. First amplifying unit 314 may include a PMOS transistor P4, resistors R2 and R3, and an amplifier op1. Second amplifying unit 315 may include PMOS transistors P5 and P6, a resistor R4, and an amplifier op2.

Pull-up unit 312, which may include a PMOS transistor P1, may be connected between a power voltage terminal and a node A, and has a gate to receive temperature sensor activation signal TEMP_CMD. PMOS transistors P2 and P3, which may be connected in parallel between node A and resistor R1, have a gate to receive an output voltage VPTAT from amplifier op2 and an output signal from amplifier op1. Resistor R1 may be connected between a reference voltage Vref output terminal and a ground voltage terminal.

PMOS transistor P4 connected between node A and resistor R2 has a gate to receive the output signal from amplifier op1. Resistors R2 and R3 may be connected serially between a temperature detecting voltage Vtemp output terminal and the ground voltage terminal.

Amplifier op1 compares an output signal of parallel MOS diode unit PMD received through a negative (−) terminal of amplifier op1 with those of resistors R2 and R3 received through a positive (+) terminal of amplifier op1 to output a comparison result into the gate of PMOS transistor P4. Amplifier op2 compares an output signal of a node B received through a positive (+) terminal of amplifier op2 with that of a node C received through a negative (−) terminal of amplifier op2 to output a voltage VPTAT. Amplifiers op1 and op2 may be differential amplifiers.

PMOS transistor P5 connected between node A and node B has a gate to receive voltage VPTAT. PMOS transistor P6 connected between node A and node C has a gate to receive voltage VPTAT. Resistor R4 may be connected between node B and parallel MOS diode unit PMD.

Parallel MOS diode unit PMD may include a plurality of MOS diodes N1 and N2 connected in parallel between resistor R4 and the ground voltage terminal. A common gate of parallel MOS diode unit PMD may be connected to resistor R4. Serial MOS diode unit SMD may include a plurality of MOS diodes N3 and N4 connected serially between node C and the ground voltage terminal. A common gate of serial MOS diode unit SMD may be connected to node C. MOS diodes N1-N4 may be NMOS transistors.

Figure 5A:
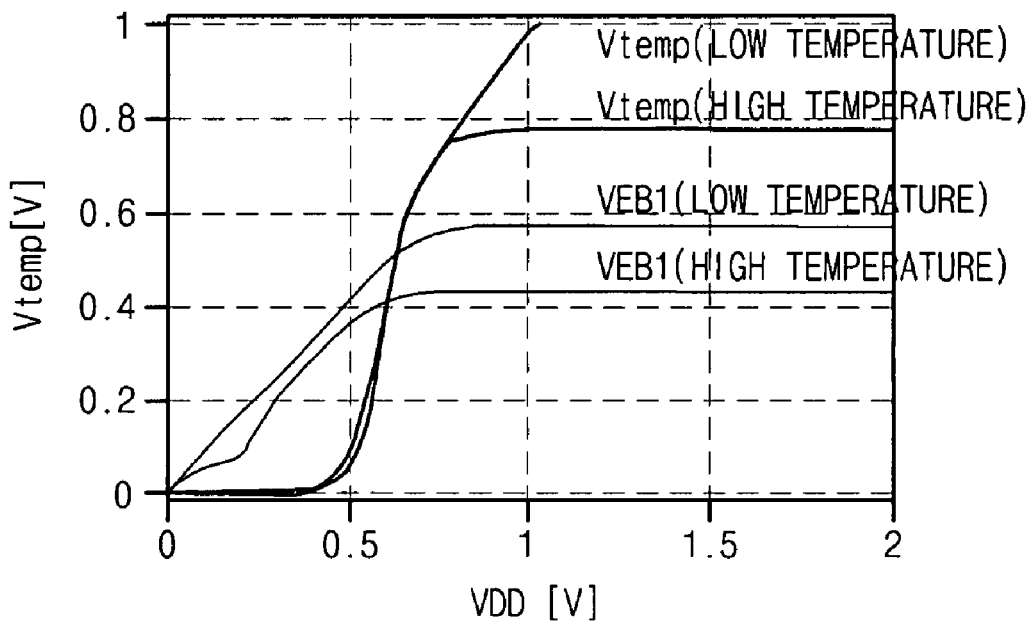
FIGS. 5a and 5b are graphs illustrating simulation results of the sense unit of FIG. 4.
Figure 5B:
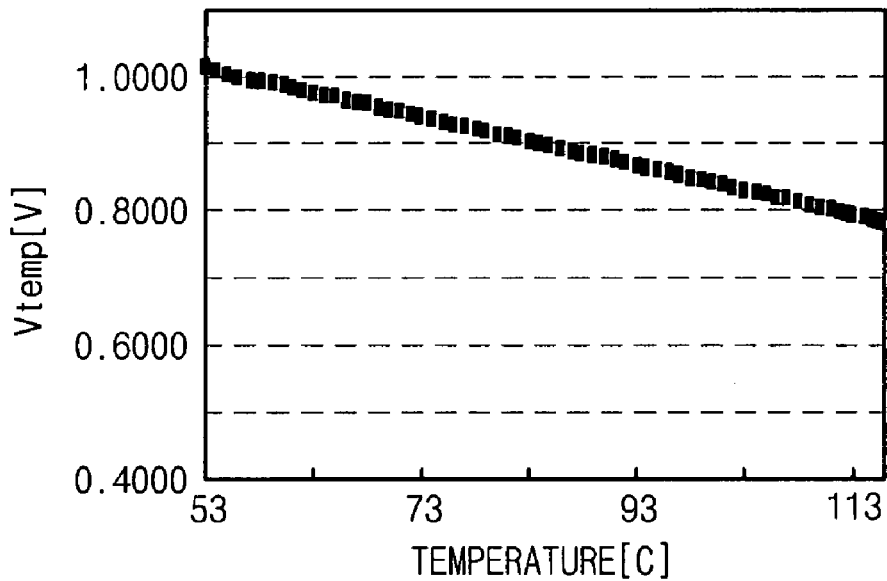

FIGS. 5a and 5b are graphs illustrating operation characteristics of temperature detecting voltage Vtemp in sense unit 311 of FIG. 4.

As shown in FIG. 5a, when power voltage VDD becomes approximately greater than 0.7, temperature detecting voltage Vtemp has a low voltage level at a high temperature and a high voltage level at a low temperature. That is, temperature detecting voltage Vtemp may decrease as temperature increases, as shown in FIG. 5b.

Figure 6:
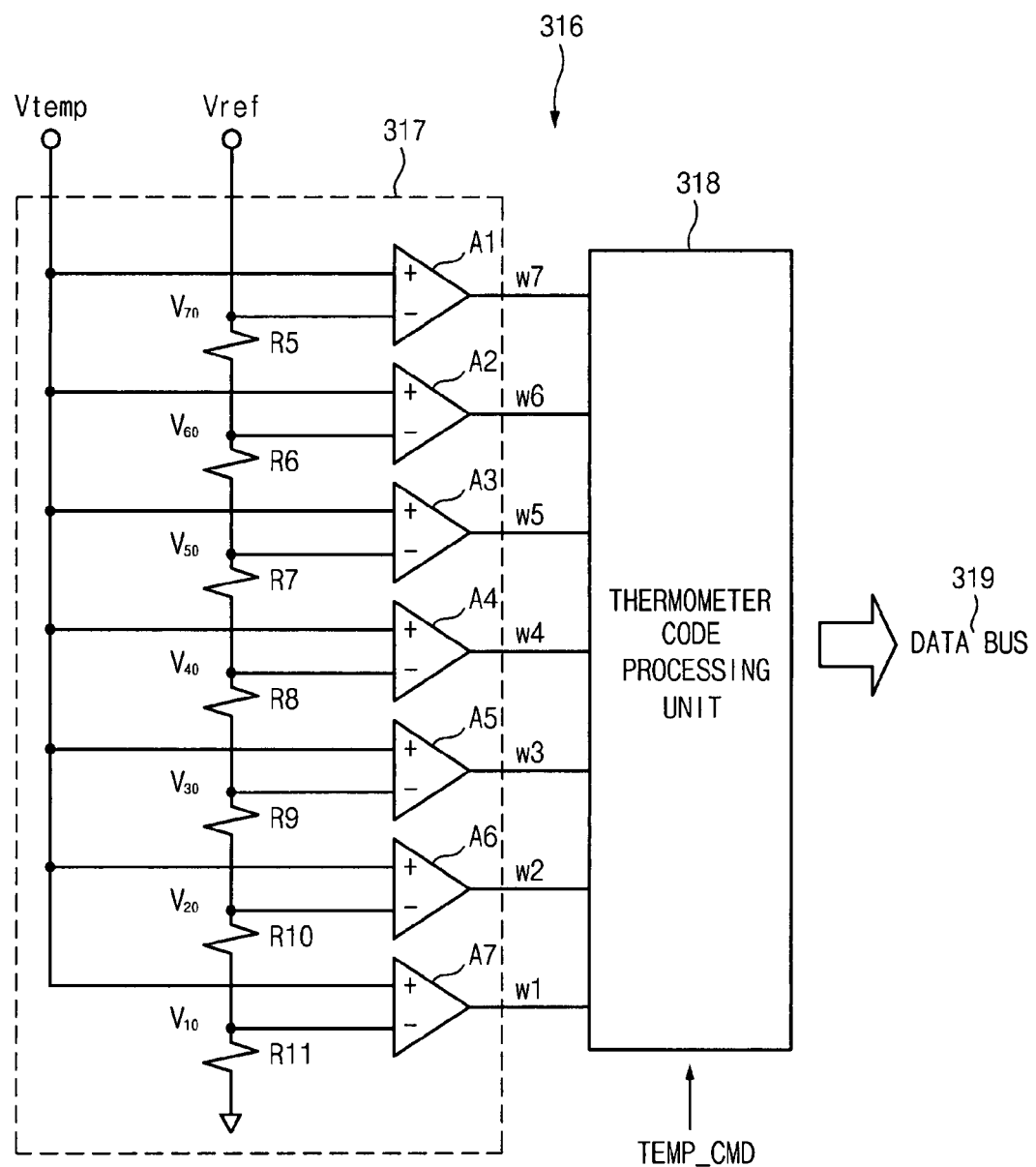
FIG. 6 is a circuit diagram illustrating the A/D converting unit of FIG. 3.

FIG. 6 is a circuit diagram illustrating A/D converting unit 316 of FIG. 3.

A/D converting unit 316 may include a thermometer code generating unit 317 and a thermometer code processing unit 318.

Thermometer code generating unit 317 may include a plurality of resistors R5~R11 and a plurality of comparators A1~A7. Resistors R5~R11 may be connected serially between reference voltage Vref terminal and the ground voltage terminal. Voltages V70~V10 represent voltage values corresponding to the detected temperature values.

Each comparator A1~A7 has a positive (+) input terminal to receive temperature detecting voltage Vtemp and a negative (−) input terminal to receive voltages V70~V10 of each connection node of resistors R5~R11, thereby outputting code signals w7~w1.

Thermometer code processing unit 318 may process code signals w7~w1 received from thermometer code generating unit 313 in response to temperature sensor activation signal TEMP_CMD to output a digital output signal. Thermometer code processing unit 318 may include a decoding unit configured to decode thermometer code signals w7~w1 and output the signals as a digital output into data bus 319.

Hereinafter, a process for operating the above-depicted RFID device 50 will be described with reference to the accompanying drawings.

Digital block 200 may output temperature sensor activation signal TEMP_CMD into temperature sensor processing unit 310, so as to detect a temperature change of the RFID tag chip. Digital block 200 may output temperature address TEMP_ADD into peripheral circuit unit 320 of memory block 300, so as to allot a given region to cell array 330.

Temperature sensor processing unit 310 may detect the temperature change of the RFID tag chip in response to temperature sensor activation signal TEMP_CMD, and convert the temperature change into a voltage to output the voltage into data bus 319.

Peripheral circuit unit 320 may control word line WL and plate line PL for driving temperature memory 350 in response to temperature address TEMP_ADD received from digital block 200, and control temperature sensor processing unit 310. Temperature memory 350 may receive data corresponding to the temperature detected by temperature sensor processing unit 310 through data bus 319 and input/output unit 360, and store the data.

Sense unit 311 may sense the temperature of the RFID tag chip in response to temperature sensor activation signal TEMP_CMD received from digital block 200 to output reference voltage Vref and temperature detecting voltage Vtemp into A/D converting unit 316.

PMOS transistor P1 of sense unit 311 may be turned on when a voltage level of temperature sensor activation signal TEMP_CMD is lower than that of power voltage VDD−Vth (threshold voltage), so that current flows through resistor R4. A voltage of a node D may include a gate-drain voltage of MOS diodes N1 and N2.

The gate-drain voltage of MOS diodes N1 and N2 as a built-in voltage of a P/N junction has a fixed given voltage regardless of change of power voltage VDD, and has a voltage level VEB1.

Node D having voltage level VEB1 may be connected to the negative (−) input terminal of amplifier op1. A node E may be connected to the positive (+) input terminal of amplifier op1. As a result, node E forms a closed loop having a negative feed back to node D. That is, amplifier op1 is operated such that a voltage of node E becomes VEB1. Temperature detecting voltage Vtemp may be represented by Equation 1.

$$Vtemp = VEB1 \times (R2+R3)/R3 \quad \text{[Equation 1]}$$

Voltage VEB1 has a negative temperature characteristic, that is, voltage VEB1 decreases when temperature increases. A voltage change ΔVEB1 of voltage VEB1 resulted from a temperature change may be related to a temperature detecting voltage change ΔVtemp according to the following equation.

$$\Delta Vtemp = \Delta VEB1 \times (R2+R3)/R3 \quad \text{[Equation 2]}$$

Here, temperature detecting voltage change ΔVtemp is an output voltage, a value of which may be changed depending on the temperature change. Further, the value of temperature detecting voltage change ΔVtemp is amplified by (R2+R3)/R3 of the value of voltage change ΔVEB1.

Node B may be connected to the positive (+) input terminal of amplifier op2, and node C may be connected to the negative (−) input terminal of amplifier op2. Node D may have voltage VEB1, which is a voltage between a gate and a drain of MOS diodes N1 and N2. Node C may have a voltage VEB2, which is a voltage between a gate and a drain of MOS diodes N3 and N4. Node B may have the same voltage as that of node C, because node B performs a negative feedback amplification operation by amplifier op2 and PMOS transistor P5 to node C. As a result, a voltage VB of node B and a voltage VC of node C may become the same as voltage VEB2.

Current I3 flowing through resistor R4 may be represented by the following equation.

$$\text{Current } I3 = (VEB2 - VEB1)/R4 \quad \text{[Equation 3]}$$

Sizes of MOS diodes N1 and N2 are configured to be larger by N times than those of MOS diodes N3 and N4. A difference of voltage VEB of another MOS transistor, whose size is different by N times, is represented by Vtln(N). Vt denotes a voltage that represents a temperature having a value of KT/q. When a size ratio of PMOS transistor P6 is larger by α times than PMOS transistor P5, the difference of voltage VEB becomes Vtln(α×N). Current I3 is represented by the following equation.

$$\text{Current } I3 = (Vtln(\alpha \times N))/R4 \quad \text{[Equation 4]}$$

Current I3 has a current value proportional to absolute temperature (PTAT), i.e., current increases when temperature increases. When the size of PMOS transistor P2 is the same as that of PMOS transistor P5, a gate of PMOS transistor P2 is commonly connected to voltage VPTAT with PMOS transistor P5, wherein current I3 is equal to current I1 and current I4 is equal to current I2. As a result, reference voltage Vref is equal to R1(I1+I4).

Thermometer code generating unit 317 of A/D converting unit 316 may divide a temperature code section into n intervals through resistors R5~R11 based on reference voltage Vref. N-divided temperature code sections V70~V10 may be compared with temperature detecting voltage Vtemp to generate N thermometer code signals w7~w1. Thermometer code processing unit 318 may decode thermometer code signals w7~w1 in response to temperature sensor activation signal TEMP_CMD to output the corresponding digital output signal into data bus 319.

In one embodiment, a plurality of temperature addresses TEMP_ADD may be allotted, so that a plurality of temperature memory regions in temperature memory 350 are additionally allotted. Each temperature address TEMP_ADD can be selectively read or written by a reader of RFID device 50. As a result, temperature addresses TEMP_ADD can be used to analyze a temperature history relation at each check point during a material moving process.

As described above, RFID device 50 according to an embodiment consistent with the present invention may detect a temperature directly in a RFID tag chip to output a voltage without requiring an additional thermometer circuit. Because RFID device 50, in one embodiment, may be configured to include a temperature detecting function employing a relatively simple circuit, a layout area of RFID device 50 may thus be reduced. Also, a temperature is sensed using NMOS transistors so that a temperature sensor circuit can be embodied in a simpler process. In a circuit using a low power voltage, a change of output voltages resulting from a temperature change is stabilized so as to output accurate temperature information. The temperature data detected in the RFID tag chip may be stored and accumulated in a temperature memory allotted in a given region of the cell area, so as to utilize the temperature information easily.

The foregoing description of various embodiments consistent with the invention has been presented for purposes of illustrating and description. It is not intended to be exhaustive or to limit the scope of the invention to the precise form disclosed. Modifications and variations are possible in light of the above teachings or may be acquired from practice of the invention. Thus, the embodiments were chosen and described in order to explain the principles of the invention and its practical applications to enable one skilled in the art to utilize the invention in various embodiments and with various modifications as are suited to the particular use contemplated.

What is claimed is:

1. A radio frequency identification (RFID) device, comprising:
   an analog block configured to receive a radio frequency signal so as to output an operation command signal;
   a digital block configured to output an address, a temperature address, an operation control signal, and a temperature sensor activation signal in response to the operation command signal received from the analog block, and to supply a corresponding response signal to the analog block;
   a memory block in the form of a ferroelectric random access memory configured to receive the address, the temperature address, and the operation control signal so as to generate an internal control signal for controlling an internal operation, and to read/write data in a cell array comprising a non-volatile ferroelectric capacitor in response to the internal control signal;
   a temperature sensor processing unit configured to detect a temperature change of an RFID tag in response to the temperature sensor activation signal; and
   a temperature memory included in the memory block and configured to store temperature data detected from the temperature sensor processing unit in a specific region of the cell array allotted by the temperature address,
   wherein the temperature sensor processing unit is included in the memory block.

2. The RFID device according to claim 1, wherein the memory block further comprises:
   a peripheral circuit unit configured to receive the address, the temperature address, and the operation control signal so as to generate the internal control signal;
   the cell array configured to read/write the data in the non-volatile ferroelectric capacitor in response to the internal control signal; and
   a sense amplifier unit configured to sense and amplify data stored in the cell array and an input/output unit configured to output input data received from a data bus into the cell array.

3. The RFID device according to claim 2, wherein the temperature sensor processing unit is controlled by the peripheral circuit unit.

4. The RFID device according to claim 1, wherein the temperature sensor processing unit comprises:
   a sense unit configured to detect a temperature change in the RFID tag in response to the temperature sensor activation signal so as to output a reference voltage and a temperature detecting voltage; and
   an analog-to-digital (A/D) converting unit configured to convert the reference voltage and the temperature detecting voltage in response to the temperature sensor activation signal.

5. The RFID device according to claim 4, wherein the temperature detecting voltage decreases when the temperature increases.

6. The RFID device according to claim 4, wherein the sense unit comprises:
   a first temperature detecting unit configured to output a detected temperature change through a first MOS diode element as a first voltage value;
   a first amplifying unit configured to compare a divided voltage value with an output signal of the first temperature detecting unit so as to output the temperature detecting voltage;
   a second temperature detecting unit configured to output a temperature change detected through a second MOS diode element as a second voltage value;
   a second amplifying unit configured to compare an output signal of the first temperature detecting unit with that of the second temperature detecting unit; and
   a reference voltage generating unit configured to compare an output signal of the first amplifying unit with that of the second amplifying unit and to output a reference voltage.

7. The RFID device according to claim 6, wherein the first MOS diode element includes a NMOS transistor.

8. The RFID device according to claim 6, wherein the second MOS diode element includes a NMOS transistor.

9. The RFID device according to claim 6, wherein the first temperature detecting unit is connected in parallel to the first MOS diode element.

10. The RFID device according to claim 9, wherein a gate-drain voltage of the first MOS diode element has a fixed given value regardless of change of a power voltage.

11. The RF1D device according to claim 6, wherein the second temperature detecting unit is serially connected to the second MOS diode element.

12. The RFID device according to claim 6, wherein the sense unit further comprises a pull-up unit configured to activate the sense unit in response to the temperature sensor activation signal.

13. The RFID device according to claim 6, wherein a size of the first MOS diode is larger than a size of the second MOS diode.

14. The RFID device according to claim 6, wherein the reference voltage generating unit comprises:
   first and second driving elements configured to receive output signals of the first amplifying unit and the second amplifying unit; and
   a first resistor connected between the first and second driving elements and a ground voltage terminal.

15. The RFID device according to claim 6, wherein the first amplifying unit comprises:
   an amplifier configured to compare the divided voltage value with the output signal of the first temperature detecting unit;
   a third driving element configured to be driven selectively in response to an output signal of the amplifier; and
   a second resistor and a third resistor connected between the third driving element and the ground voltage terminal and configured to output the divided voltage value.

16. The RFID device according to claim 4, wherein the A/D converting unit comprises:

a thermometer code generating unit configured to compare the temperature detecting voltage with the reference voltage so as to generate a plurality of thermometer code signals; and a thermometer code processing unit configured to decode the plurality of thermometer code signals in response to the temperature sensor activation signal.

17. The RFID device according to claim 16, wherein the thermometer code generating unit comprises:

a plurality of resistors configured to divide the reference voltage so as to N-divide a plurality of temperature code sections and output a plurality of voltage values; and a plurality of comparators configured to compare the temperature detecting voltage with the plurality of voltage values so as to generate the plurality of thermometer code signals.

18. The RFID device according to claim 16, wherein the thermometer code processing unit includes a decoding unit configured to decode the plurality of thermometer code signals so as to output the thermometer code signals into the data bus.

* * * * *